April 9, 1963   H. W. GETZ ET AL   3,084,714

VACUUM PULSATOR CONTROL VALVE

Filed June 2, 1961

INVENTORS,
HARRY W. GETZ,
DALE A. CHISHOLM,

BY *Frank Groom Kirtz*

ATTORNEY.

3,084,714
VACUUM PULSATOR CONTROL VALVE
Harry W. Getz, 6318 Jefferson Ave., and Dale A. Chisholm, 6314 Jefferson Ave., both of Berkeley, Mo.
Filed June 2, 1961, Ser. No. 114,390
2 Claims. (Cl. 137—589)

This valve may be used for a pulsator in a milking machine, although there are other uses in which a pulsing action in the application of pressure and vacuum may be desired.

It is one of the objects of the present invention to provide a control valve for milking machines in which there is a snap-action, that is, in which the change from vacuum to pressure and back is accomplished by an extremely rapid transition.

Another object of this invention is to provide a valving sequence in which the milking operation will proceed faster. For this purpose the control valve must be able to control a fairly heavy pressure.

Another object of the invention is to provide a control valve for a milking machine in which any clogging is minimized, since no close cylindrical fits or seals are required.

A further object of the invention is to provide a valve in which condensing water freezing inside the valve in the winter will not damage the valve where the motor drive is energized.

A further object is to provide a valve in which the magnitude of the actuating forces is limited to that necessary to seal the ports and not to overcome a differential pressure.

Another object of this invention is to provide a construction which is directly driven, which contains no microswitch or such delicate part which can fatigue. Thus the construction of our valve is intended to provide a simple, efficient valve which will operate for a very long time, much longer than any of the devices now in use.

Another object is to provide a valve with two input manifolds and two output work ports, in which the two inputs are valved back and forth between the two output work ports.

The attainment of the above and further objects of the present invention will be apparent to those skilled in the art from the following specification taken in conjunction with the accompanying drawings forming a part hereof.

In the drawings.

Reference may now be had more particularly to the drawings wherein like reference numerals designate like parts throughout.

Figure 1:
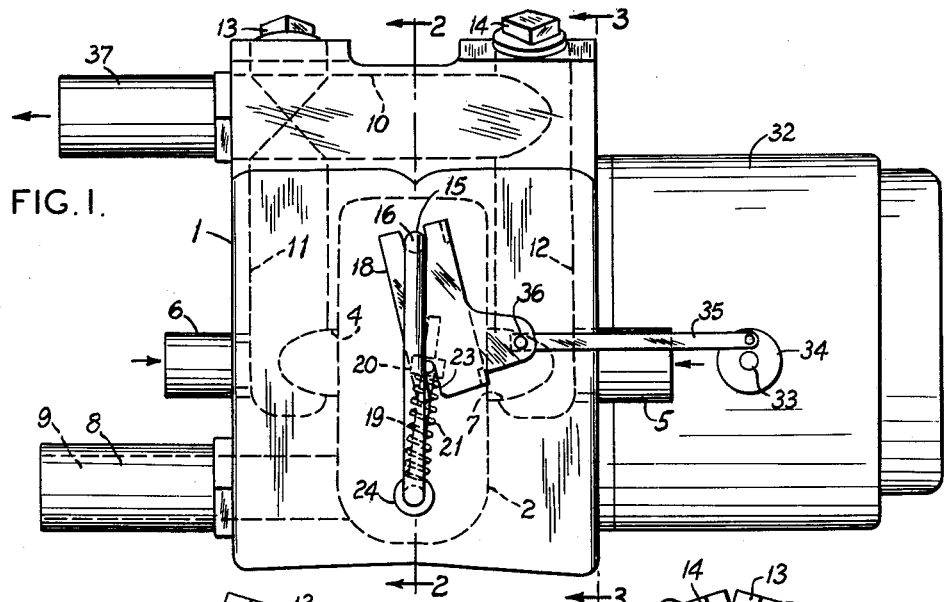
FIGURE 1 is a side elevation of the valve.
Figure 2:
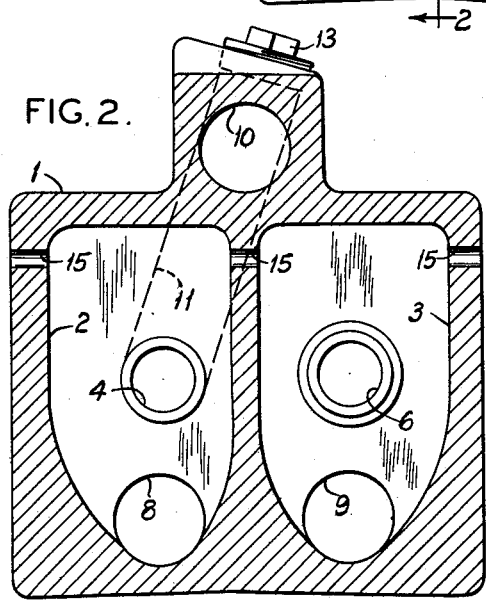
FIGURE 2 is a sectional view taken along the line 2—2 of FIGURE 1 with valve parts omitted for clarity.
Figure 3:
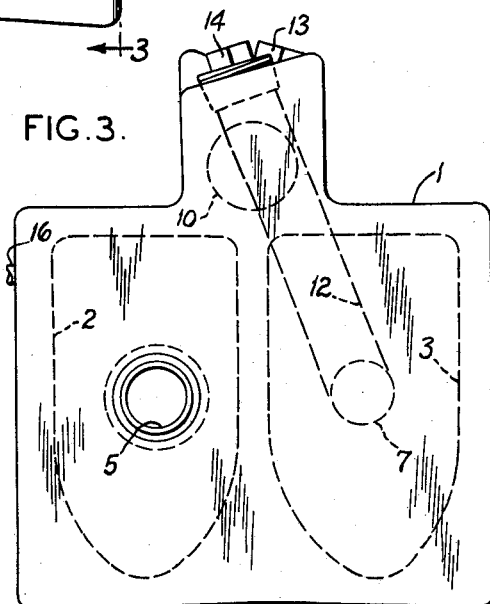
FIGURE 3 is a rear view of the valve, taken along line 3—3 of FIGURE 1 with valve parts omitted for clarity.

The control valve of the present invention consists of a valve body or block 1. The block consists of a casting having two separate hollow chambers 2 and 3. Each chamber is provided with two ports situated in opposite walls of the chamber. The ports in chamber 2 are numbered 4 and 5, while those in chamber 3 are numbered 6 and 7. At their lower portions, chambers 2 and 3 are provided with the work ports 8 and 9 respectively.

At the top center of the valve body 1 is drilled the bore 10, the vacuum bore. The vacuum bore 10 communicates with port 4 in chamber 2 through the vacuum manifold 11; vacuum bore 10 communicates with port 7 in chamber 3 through the vacuum manifold 12. The vacuum manifolds 11 and 12 are drilled for convenience in manufacturing and then are sealed at the positions where they enter the valve body with the caps 13 and 14, through which access may be had to them. Ordinarily these caps are tightly engaged and seal the manifolds at their ends.

Figure 4:
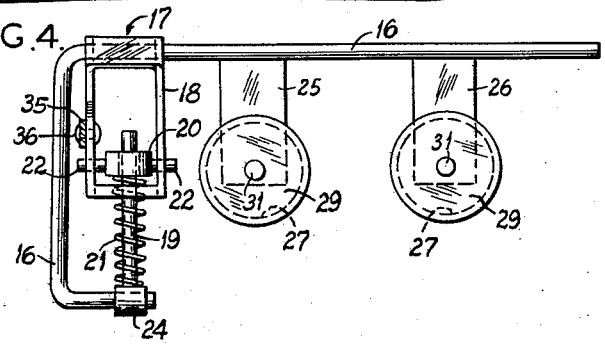
FIGURE 4 is a view of the overcenter drive mechanism and the flappers.

Passing through the valve body, through the two chambers is a small bore 15 in which the shaft 16 lies disposed. In FIGURE 4 shaft 16 is shown to be a U-shaped member. Riding upon the leftmost U-portion of the shaft 16 is the overcenter drive assembly 17, consisting of the yoke member 18, bearing shaft 19, bearing 20, in which the shaft 19 rides, and spring 21.

The bearing 20 has two pin extensions 22 on opposite sides. These pin extensions 22 ride in slots 23, one of which is shown in FIGURE 1 in the yoke member 18. The bearing 20 is held in position by the spring 21, whose opposite end rests on a boss 24 on shaft 19.

Figure 5:
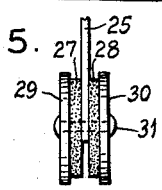
FIGURE 5 is a detail view of the flapper closure element from the side.

Hanging from the shaft 16 and integral therewith are the flappers 25 and 26. A flapper or port-sealing element is shown from the side view in FIGURE 5. Each flapper consists of a flat piece of metal carrying a sandwich composed of two discs of sponge rubber and two thin metal discs. The sponge rubber discs are numbered 27, 28; the metal discs are numbered 29, 30. They are held in place by a bolt 31, through the assembly.

The overcenter drive assembly 17 is actuated by the motor 32, through its drive shaft 33, carrying a cam 34. Camshaft 35 is connected at one end to the cam 34 and at the other to the pin 36 on the yoke 18.

The operation of the flappers is quite simple. The flapper 25 is positioned in chamber 2 and the flapper 26 in chamber 3. Thus 25 reciprocates between and against the ports 4 and 5, while the flapper 26 reciprocates between and against the ports 6 and 7. Since the flappers 25 and 26 are always in the same relative position, the following sequencing takes place. When 25 closes port 4, 26 closes port 6 in the other chamber. Similarly, when 25 closes port 5, 26 closes port 7 in the other chamber.

In operation the vacuum connection at 37 is connected. Thus a vacuum exists in the bore 10 and in the bores 11 and 12, which comprise the so-called vacuum loop. This loop can be interrupted, of course, by the flappers 25 and 26 when they close the ports 4 and 7. The ports 5 and 6 are connected or vented to the outside, that is, to atmospheric pressure: This comprises a novel part of our invention in that a pressure loop through the valve is cade complete through the outside atmosphere.

It will be noted that at all times, regardless of the positions of the flappers 25 and 26 and their cooperative ports, there is a net resultant torque on the actuating shaft 16 of zero, due to pressures. In other words, whenever there is a pressure (for instance, full atmospheric pressure) on a flapper in one chamber, there is an equal and opposite pressure on the other flapper in the other chamber. Thus there is no differential of pressure to be overcome by the drive mechanism.

Assuming ports 4 and 6 are closed by flappers 25 and 26, then chamber 2 is at atmospheric pressure and port 4 exerts a vacuum. In chamber 3 there is a vacuum and port 6 exerts atmospheric pressure. Flapper 25 will be held against the port 4 by atmospheric pressure in chamber 2, flapper 26 will be subjected to vacuum suction in chamber 3, and atmospheric pressure in port 6. Therefore, since the areas of the ports are equal, the pressure forces exerted on the flappers are equal and opposite.

Now the two work ports are connected to their teat cups in the well-known manner of the art. The object is to alternately connect the teat cups with a source of vacuum suction and with atmospheric pressure. Also, it may be viewed as alternately producing positive and negative pressure at a predetermined point.

Each work port is therefore connected to one or more sets of teat cups and the motor is turned on. The motor, through its drive shaft, cam, and so forth, reciprocates the flappers 25 and 26 to extreme positions against the walls containing the ports. The sponge rubbers 27 and 28 are alternately compressed as the metal discs 29 and 30 on opposite sides are held firmly against and closing the ports.

In the extreme position to the right in FIGURE 1, flappers 25 and 26 close the ports 5 and 7, but leave open the ports 4 and 6. When port 4 is open, the vacuum suction through the manifold 10 and the bore 11 is exerted on the work port 8, since these are interconnected in chamber 2. At the same time, in chamber 3 port 6 is open and atmospheric pressure is exerted through 6, through chamber 3 on work port 9.

When the cam 34 rotates 180°, the yoke assembly is driven to the opposite extreme. In that position flappers 25 and 26 close the ports 4 and 6, which leaves the ports 5 and 7 open. When port 5 is open, the atmospheric pressure is exerted through the port 5 through chamber 2 on work port 8. Similarly when port 7 is open, the vacuum loop is exerting vacuum suction through manifold 10, bore 12, port 7, chamber 3, and the work port 9 which are interconnected.

Thus it will be seen, the work ports are alternatively connected to atmospheric pressure and vacuum suction, in the manner required by the teat cups and the milking art.

The overcenter drive has the following action. When the cam is between the two extreme position described above, whether moving the yoke assembly right or left in FIGURE 1, the important criterion is whether the bearing shaft 19 is moving toward the central position intermediate the two extremes or away from the center position. When moving toward the central position, the spring 21 is being compressed, storing energy in the spring. When moving away from the central position, the spring is being released. When the spring is being released, the energy in the spring is added to the drive of the flappers 25 and 26; when the spring is being compressed, the energy is put into the compression of the spring rather than in the drive of the flappers. Thus the flappers are snapped against and away from the ports, providing a rapid transition from opening to closing and again to opening the ports. This snap-action is desirable in that it provides the best type of pulsation in the pressures and suctions exerted in the lines to the teat cups through the work ports.

Having thus described our invention with particularity to detail, it is not our intention, unless otherwise indicated in the claim, to limit the invention here shown for the purpose of illustration, but to claim all variations, modifications, and rearrangements equivalent thereto.

We claim:

1. A control valve, comprising a valve block, provided with two chambers formed by the walls of said valve block, and a closed connection with a source of vacuum, a work port in each chamber, a pair of ports in each chamber and located in opposite walls thereof, a bore in the wall of each chamber connecting between one of said pair of ports and said closed connection with said source of vacuum, the other of said pair of ports extending through the wall of each chamber to the atmosphere, a drive shaft through both of said chambers, and port-sealing flapper elements on said shaft to seal the ports in said chambers, an overcenter drive assembly mounted on said shaft, a pair of sponge rubber discs mounted on said flapper elements on opposite sides thereof, a pair of metal discs larger than said ports in diameter and disposed on opposite and outer sides of said pair of sponge rubber discs, and yieldably mounted to said flapper elements and a motor connected to said drive assembly to drive said shaft through said overcenter drive assembly.

2. A control valve, comprising a valve block, provided with two chambers formed by the walls of said valve block and a closed connection with a source of vacuum, a work port in each chamber, a pair of ports in each chamber located in opposite walls thereof, a bore in the wall of each chamber connecting between one of said pair of ports and said closed connection with said source of vacuum, the other of said pair of ports extending through the wall of each chamber to the atmosphere, a drive shaft through both of said chambers, flapper elements on said shaft to seal the ports in said chambers and a pair of sponge rubber discs mounted on said flapper elements on opposite sides thereof, a pair of metal discs larger than said ports in diameter and disposed on opposite and outer sides of said pair of sponge rubber discs, and yieldably mounted to said flapper elements, a drive assembly mounted on said shaft and a motor connected to said drive assembly to drive said shaft through said drive assembly.

References Cited in the file of this patent

UNITED STATES PATENTS

| | | |
|---|---|---|
| 1,029,216 | Newell | June 11, 1912 |
| 1,493,781 | Kennedy | May 13, 1924 |
| 1,494,577 | Birdsall | May 20, 1924 |
| 1,960,702 | Hapgood | May 29, 1934 |